US011588686B2

(12) United States Patent
Cagle et al.

(10) Patent No.: US 11,588,686 B2
(45) Date of Patent: Feb. 21, 2023

(54) DYNAMIC PORT CONFIGURATION FOR NETWORK ROUTERS

(71) Applicant: T-Mobile USA, Inc., Bellevue, WA (US)

(72) Inventors: Damon Cagle, Maple Valley, WA (US); Hailei Cheng, Chicago, IL (US)

(73) Assignee: T-Mobile USA, Inc., Bellevue, WA (US)

( * ) Notice: Subject to any disclaimer, the term of this patent is extended or adjusted under 35 U.S.C. 154(b) by 66 days.

(21) Appl. No.: 16/997,873

(22) Filed: Aug. 19, 2020

(65) Prior Publication Data

US 2022/0060377 A1 Feb. 24, 2022

(51) Int. Cl.
*H04L 41/0806* (2022.01)
*H04L 41/08* (2022.01)
*H04L 47/24* (2022.01)

(52) U.S. Cl.
CPC ...... *H04L 41/0809* (2013.01); *H04L 41/0879* (2013.01); *H04L 47/24* (2013.01)

(58) Field of Classification Search
CPC .. H04L 47/24; H04L 41/0879; H04L 41/0809
See application file for complete search history.

(56) References Cited

U.S. PATENT DOCUMENTS

| | | | | |
|---|---|---|---|---|
| 2017/0364295 | A1* | 12/2017 | Sardinha | ............... G06F 1/1632 |
| 2018/0295021 | A1* | 10/2018 | Page | .................. H04L 41/0816 |
| 2018/0359119 | A1* | 12/2018 | Vermes | .................. H04L 12/66 |
| 2019/0033536 | A1* | 1/2019 | Apro | .................... G02B 6/4292 |
| 2021/0352147 | A1* | 11/2021 | Babu | ..................... H04L 43/062 |

* cited by examiner

*Primary Examiner* — Azizul Choudhury
(74) *Attorney, Agent, or Firm* — Han Santos, PLLC

(57) ABSTRACT

A small form-factor pluggable (SFP) transceiver is detected to be plugged into an SFP port of the network router following a bootup of the network router. Information on one or more device features of the SFP transceiver is obtained from the SFP transceiver plugged into the SFP port of the network router. Subsequently, a port configuration policy that corresponds to the one or more device features of the SFP transceiver and one or more router parameters of the network router is applied to the SFP port of the network router.

20 Claims, 6 Drawing Sheets

DYNAMIC PORT CONFIGURATION FOR NETWORK ROUTERS

BACKGROUND

Network routers are used by a variety of networks to route and distribute network data traffic between network endpoints. For example, a wireless carrier network may use a backhaul network that is equipped with multiple network routers to transport network data traffic between a radio access network (RAN) and a core network of the wireless carrier network. Network routers may be connected to each other via wired connections that plug into physical ports of the network routers. In some instances, the wired connection may be implemented using copper-based cables that plug into ethernet ports of the network routers. However, in other instances, network routers may be equipped with small form-factor pluggable (SFP) ports that accept SFP network interface modules. These SFP network interface modules are also known as SFP transceivers.

An SFP transceiver is a device that converts electrical signals into optical signals and vice versa. For example, a first SFP transceiver installed at an SFP port of a network router may convert an electrical signal outputted at an SFP port of a network router into an optical signal for transport using a fiber optic cable to a second SFP transceiver installed at the SFP port of another piece of network equipment. In turn, the second SFP transceiver may convert the optical signal back into the electrical signal for use as input by the network equipment. Likewise, an electrical signal outputted at the SFP port of the network equipment may be similarly converted by the first and second SFP transceivers to an optical signal and then back to an electrical signal for input to the network router. Further, the SFP ports of a network router are capable of dynamically supporting different data speeds. For example, depending on the data transmission speed capability of an inserted SFP transceiver, an SFP port of the network router may support data speeds such as 1.0 gigabits/per second (Gbps), 10 Gbps, 25 Gbps, 40 Gbps, 100 Gbps, etc.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
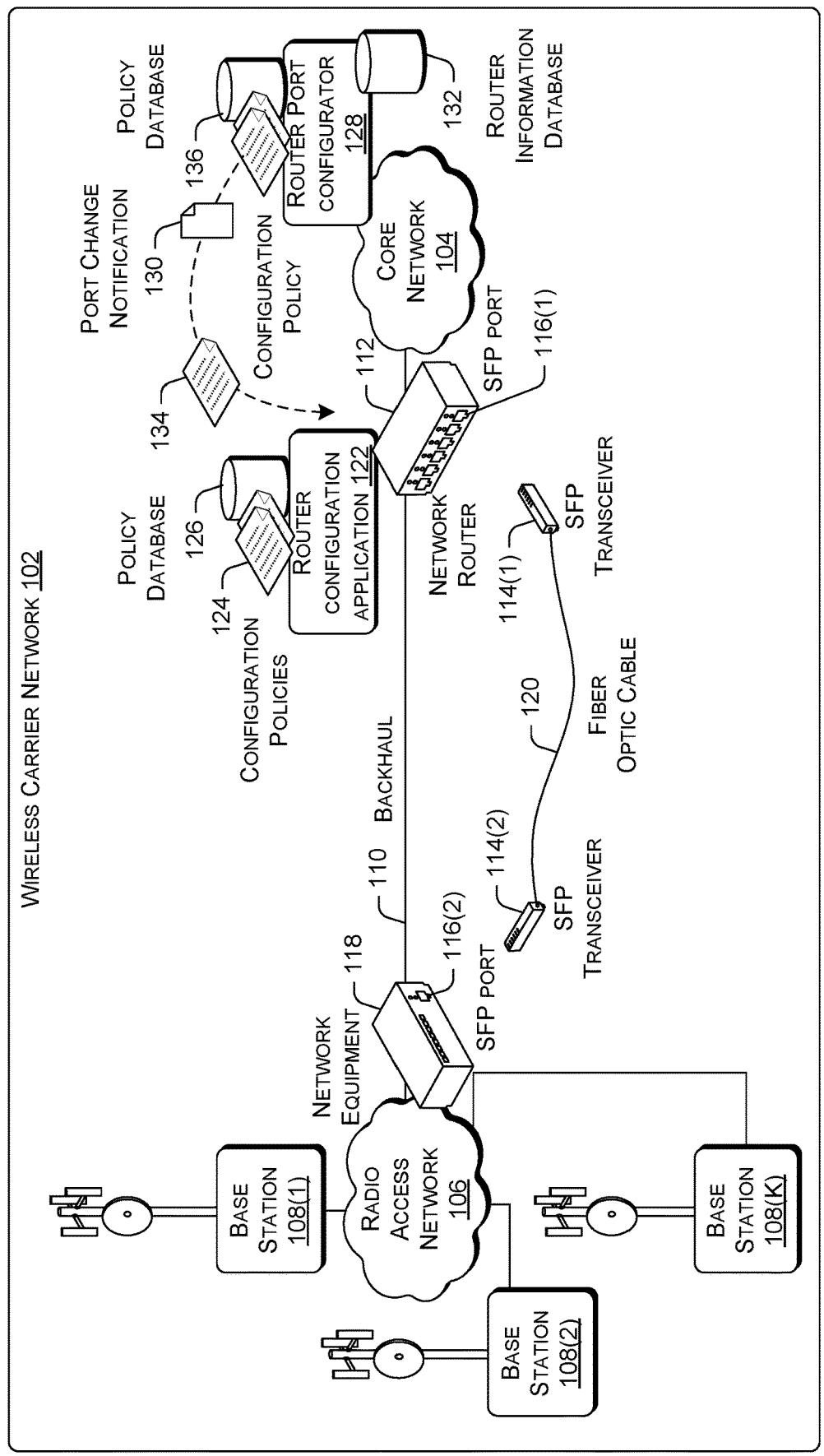
FIG. 1 illustrates an example network architecture for dynamically implementing a port configuration policy for a port of a network router.

This disclosure is directed to techniques for dynamically implementing a port configuration policy for a port of a network router. The port configuration policy may be dynamically implemented by a router port application that resides on the network router. The port configuration policy may be one of the multiple configuration policies that are stored in a memory of the network router. Alternatively, the port configuration policy may be dynamically implemented by a router port configurator of a network. In one example, the network may be a wireless carrier network, and the router port configurator may be an application that is a part of the Operations Support System (OSS) of the wireless carrier network.

In some instances, the port configuration policy may be implemented when a data transmission speed of the port is reconfigured. In at least one embodiment, the port of the network router may be a small form-factor pluggable (SFP) port, and the data transmission speed of the port may be reconfigured when the network router detects that an SFP transceiver is plugged into the SFP port. In such an example, the router port application on the network router may detect the SFP transceiver following the bootup of the router or following the insertion of the SFP transceiver into the SFP port. Subsequently, the SFP transceiver may provide information on one or more device features of the SFP transceiver to the router port application. In turn, the router port application may apply a port configuration policy that corresponds to the one or more device features of the SFP transceiver and one or more router parameters of the router to the SFP port.

In alternative embodiments, the router port configurator of the network may receive a port change notification from a network router that is a part of the network. The port change notification may indicate that a new SFP transceiver is installed at an SFP port of the network router. Subsequently, the router port configurator may receive information on one or more device features of the SFP transceiver from the SFP transceiver or from an SFP information database of the network. The router port configurator may also access one or more router parameters of the network router from a router information database of the network. Subsequently, the router port configurator may determine whether an existing port configuration policy that corresponds to the one or more device features and the one or more router parameters of the network router is applied to the SFP port. Thus, if no existing port configuration policy is applied or a different port configuration policy is applied, the router port configurator may apply a port configuration policy that corresponds to the one or more device features and the one or more router parameters of the network router to the SFP port.

In additional embodiments, the router port application of the network router or the router port configurator of the network may receive a measured data transmission speed of the SFP transceiver that is installed at an SFP port of the network router. The data transmission speed of the SFP transceiver may be measured as the SFP transceiver is exchanging data with another SFP transceiver installed at the SFP port of another device equipment. The router parameters of the network router are then ascertained by the router port application or the router port configurator. A port configuration policy that corresponds to at least the measured data transmission speed of the SFP transceiver and the one or more router parameters of the network router may then be applied to the SFP port by the router port application or the router port configurator if such a policy is not currently applied. In other instances, a port configuration policy may be implemented for a port by the router port application or the network router configurator for other purposes. For example, such purposes may include network route dampening, network architecture reconfiguration of a network that includes the network router, and/or so forth.

The dynamic implementation of port configuration policies for network router ports may be advantageous in various scenarios. In one scenario, the port configuration policy may be a Quality of Service (QoS) policy for a port of a router. In such a scenario, the port may be routing data traffic from an upstream higher speed network interface (e.g., 10 Gbps) to a lower speed network interface (e.g., 1.0 Gbps). Without the QoS policy, a large incoming data burst may result in the port bursting data traffic at a speed that is higher than the speed of a downstream lower speed network interface, resulting in dropped data packets and data packet transmission requests. Such drop of the data packets may violate QoS guarantees established by the network.

In contrast, the QoS policy may configure the port to queue the incoming data traffic from the upstream higher speed network interface in a router buffer allocated to the port, and then serialize out the data traffic from the buffer at a data transmission speed that is equal to or less than the speed of the downstream lower speed network interface. The QoS policy may also include port configuration settings, such as a buffer size setting, priority traffic settings, best effort settings, bottom queue settings, etc. for various data traffic types. Thus, the dynamic implementation of a QoS policy for a network router port without manual intervention may prevent data packet drops and retransmission requests that violate QoS guarantees. The port configuration policies for a network router port may include ingress policies for data traffic coming into the port, as well as egress policies for data traffic leaving the port. The techniques described herein may be implemented in a number of ways. Example implementations are provided below with reference to the following figures.

Example Network Architecture

FIG. 1 illustrates an example network architecture for dynamically implementing a port configuration policy for a port of a network router. The network architecture 100 may include a network, such as the wireless carrier network 102. The wireless carrier network 102 may be operated by a mobile network operator (MNO). The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network 104 by a wide area network (WAN). Each regional portion of the wireless carrier network 102 may include one or more RANs and a regional circuit and/or packet-switched network and associated signaling network facilities. The wireless carrier network 102 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth.

A RAN of the wireless carrier network 102 may include a number of base stations. These base stations are also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and the core network 104. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch Network (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 104. The core network 104 may connect to a public packet data communication network, such as the Internet, via one or more gateways. Accordingly, data and voice communications via the RANs, the core network 104, and the Internet may support a variety of telecommunication services through the wireless carrier network 102. For example, the RAN 106 of the wireless carrier network 102 may include base stations 108(1)-108(K), and the RAN 106 may be connected to the core network 104 via a network 110, which may be referred to as a backhaul.

The network 110 may include various network routers that are deployed to link network components to support the transmission of data via the network 110. A network router may include multiple ports that are used to connect the network router to ports of other network components in the network 110. In some embodiments, such ports may include SFP ports that support the installation of the SFP transceivers. The installation of an SFP transceiver generally involves the insertion of the SFP transceiver into an SFP port, and then connecting the SFP transceiver to another SFP transceiver of another piece of network equipment via a fiber optic cable. For example, a network router 112 may be deployed at the core network 104 end of the network 110. Further, an SFP transceiver 114(1) may be installed at an SFP port 116(1) of the network router 112 to communicate with an SFP transceiver 114(2) installed at an SFP port 116(2) of a piece of network equipment 118 located at the RAN 106. The SFP transceiver 114(1) and the SFP transceiver 114(2) may be linked by a fiber optic cable 120 that supports the transmission of optical signals.

In some scenarios, the network router 112 may initiate a device bootup after being powered on. During the bootup of the network router 112, a router configuration application 122 of the network router 112 may read a router configuration file for the network router 112 that contains various router settings. For example, the router settings may include a feature setting regarding whether the automatic implementation of port configuration policies is active or non-active.

Following device bootup of the network router 112, the router configuration application 122 may detect the presence of an SFP transceiver 114(1) in the SFP port 116(1). For example, after receiving power from the SFP port 116(1), the SFP transceiver 114(1) may complete a device activation procedure with the network router 112. The SFP transceiver 114(1) may provide a device identifier to the network router 112 during the device activation procedure. Thus, if a feature setting of the router settings indicates that the automatic implementation of port configuration policies is active, the router configuration application 122 may obtain information on one or more device features from the SFP transceiver 114(1) after the device identifier of the SFP transceiver 114(1) is received by the application from the device activation procedure. The information may be stored in a memory, such as electrically erasable programmable read-only memory (EEPROM) of the SFP transceiver 114(1). Otherwise, the router configuration application 122 may use a default port configuration for the SFP port 116(1).

In some instances, the router configuration application 122 may obtain the information from the SFP transceiver 114(1) by sending a query command to the SFP transceiver 114(1) for the transceiver to return the information. In other instances, the router configuration application 122 may obtain the information by waiting for the SFP transceiver 114(1) to transmit the information. For example, the SFP transceiver 114(1) may be configured to transmit the information to the network router 112 at predetermined time intervals. The information on the one or more device features may include a transceiver manufacturer identifier, a transceiver model identifier, a transceiver chipset identifier, a device identifier of the transceiver (e.g., an electronic serial number), a maximum data transmission speed supported by the transceiver (e.g., 1.0 Gbps, 10 Gbps, 25 Gbps, 40 Gbps, 100 Gbps, etc.), transmission modes supported by the transceiver, and/or so forth. Accordingly, the router configuration application 122 may store such information along with a port identifier of the associated port in a port configuration table that resides in the memory of the network router 112 for later use.

Subsequently, the router configuration application 122 may detect whether the SFP port 116(1) is active. For example, the router configuration application 122 may determine that an SFP port is active when the port configuration table stored in the memory of the network router 112 indicates that the port is designated as an active port ready for use. In another example, the router configuration application 122 may determine that an SFP port is active when an SFP transceiver plugged into the port has signaled that it is ready to send and receive data after completing a handshake procedure with another SFP transceiver. In another example, the router configuration application 122 may determine that an SFP port is active when the SFP port is actively transmitting or receiving data packets via an installed SFP transceiver. Accordingly, if the router configuration application 122 determines that the SFP port 116(1) is active, the router configuration application 122 may apply a port configuration policy 124 that corresponds to the one or more device features of the SFP transceiver to the SFP port 116(1).

In various embodiments, the port configuration policy 124 may be one of multiple port configuration policies that are stored in a policy database 126 in the memory of the network router 112. Each of the multiple port configuration policies may be a policy with a corresponding set of port configuration settings that are developed for an SFP transceiver with a unique set of device features. For example, a set port configuration settings may include a data buffer size setting, high priority queue settings, best effort queue settings, a bottom queue settings, etc. for various data traffic types (e.g., voice traffic, data traffic, router control traffic, etc.). A high priority queue is a queue that may be used to route data traffic that has non-negotiable high priority QoS agreements or service level agreements (SLAs). On the other hand, a best effort queue may be used to route traffic that falls under best effort QoS agreements or SLAs. Data traffic routing performed using the best effort queue may be dynamically altered using heuristics to reduce overall routing latency, as best effort QoS agreements or SLAs generally do not require consistently good performance. Rather, good performance for a majority of a predetermined period of time may be sufficient to satisfy a best effort QoS agreement or SLA. Thus, the application of the port configuration policy 124 to the SFP port 116(1) configures the port to operate according to the port configuration settings in the policy.

The port configuration policy 124 that is applied to the SFP port 116(1) may further correspond to one or more router parameters of network router 112. The one or more router parameters of a network router may include a router manufacturer identifier, a router model identifier, a device identifier of the router (e.g., an electronic serial number), a router chipset identifier, a router hardware version identifier, a router software version identifier, and/or so forth. This is because each of the multiple port configuration policies stored in the policy database 126 is also developed based on the features and capabilities of the network router 112.

In various embodiments, the router configuration application 122 may have the ability to detect the insertion of a new SFP transceiver into the SFP port 116(1) of network router 112. Such detection may occur after the network router 112 is operational for some time or when the new SFP transceiver is plugged into the SFP port 116(1) to replace another SFP transceiver previously inserted in the SFP port 116. In some instances, SFP transceivers may be configured to complete a device activation procedure with the network router after insertion into SFP ports, in which the SFP transceivers may send their device identifiers to the network routers during the device action activation procedures. In other instances, SFP transceivers may be configured to send their device identifiers at predetermined time intervals to network routers whose SFP ports they are plugged into, or the network routers may be configured to query SFP transceivers at predetermined time intervals for their device identifiers. In these instances, the router configuration application 122 may determine that the new SFP transceiver is inserted in the SFP port 116(1) when the device identifier of the new SFP transceiver either does not match an existing device identifier stored in the port configuration table for the SFP port 116(1), or when no previous device identifier is identified by the port configuration table as being inserted in the SFP port 116(1). Following the detection that a new SFP transceiver is inserted in the SFP port 116(1), the router configuration application 122 may once again obtain information on one or more device features of the new SFP transceiver and determine whether the SFP port 116(1) is active. Accordingly, assuming that the SFP port 116(1) is determined to be active, the router configuration application 122 may dynamically apply a port configuration policy to the SFP port 116(1) from the policy database 126 that corresponds to the one or more device features of the new SFP transceiver and the one or more router parameters of the network router 112.

In other scenarios, a router port configurator 128 that resides in the core network 104 may be responsible for dynamically applying port configuration policies to the ports of network routers. The router port configurator 128 may be an application that is a part of the OSS or some other device management system of the wireless carrier network 102. In various embodiments, the router port configurator 128 may receive a port change notification 130 from the network router 112. For example, the port change notification 130 may be a simple network management protocol (SNMP) trap message or some other control plane message that is sent by the router configuration application 122 to the device management system of the wireless carrier network 102. The notification is then routed by the device management system to the router port configuration 128. The port change notification 130 may be sent by the network router 112 following detection by the router configuration application 122 that the SFP transceiver 114(1) is plugged into the SFP port 116(1). The port change notification 130 may include a router identifier (e.g., electronic serial number) of the network router 112 and a port identifier of the port that is affected.

In response, the router port configurator 128 may receive information on one or more device features of the SFP transceiver 114(1). In some instances, the router port configurator 128 may send a device information query to the network router via a device management communication, such as SNMP communication, and the router configuration application 122 on the network router 112 may obtain the information on the one or more device features from the SFP transceiver 114(1) and return the information to the router port configurator 128. In other instances, the router port configurator 128 may authenticate to the router configuration application 122 via one or more login credentials, and then trigger the router configuration application 122 to obtain the information from the SFP transceiver 114(1), as well as transmit the information on the one or more device features to the router port configurator 128. However, in alternative instances, the port change notification 130 that is sent by the router configuration application may already contain the information on the one or more device features of the SFP transceiver 114(1).

Once the information regarding the SFP transceiver 114(1) is received, the router port configurator 128 may access one or more router parameters of the network router from a router information database 132. The router information database 132 may be an information repository that is maintained by the wireless carrier network 102 regarding network routers that are active in the wireless carrier network 102. The router information database 132 may further include information on the port configuration policies that are applied to the various ports of the network routers. For example, a data entry in the router information database 132 for a port configuration policy that is applied to a port of a network router may identify one or more device features of an SFP transceiver and one or more router parameters of a router that corresponds to the port configuration policy. In some instances, the router port configurator 128 may use the router identifier from the port change notification 130 to identify the one or more router parameters of the network router 112 from the router information database 132. The router information database 132 and the policy database 126 are then used by the router port configurator 128 to determine whether a port configuration policy that corresponds to the one or more device features of the SFP transceiver 114(1) and the router parameters of the network router 112 is currently applied to the SFP port 116(1). In the event that no such port configuration policy is currently applied, the router port configurator 128 may apply such a port configuration policy to the SFP port 116(1). In some instances, the router port configurator 128 may perform such application by directing the router configuration application 122 to retrieve such a port configuration policy from its policy database 126 and apply the policy to the SFP port 116(1). For example, the router port configurator 128 may send a policy identifier of the port configuration policy to the router configuration application 122 for use by the application.

However, if no such port configuration policy exists in the policy database 126 of the network router 112, the router port configurator 128 may retrieve a port configuration policy 134 that corresponds to the one or more device features of the SFP transceiver 114(1) and the router parameters of the network router 112 from a policy database 136. The port configuration policy 134 is then transmitted by the router port configurator 128 to the router configuration application 122 for application to the SFP port 116(1). For example, the router port configurator 128 may send the port configuration policy 134 to the network router 112 via a messaging mechanism (e.g., SNMP messaging) or a file transfer mechanism, such as a file transfer based on Secure Copy Protocol (SCP), Secure File Transfer Protocol (SFTP), HTTP Secure (HTTPS), and/or so forth.

In additional scenarios, the router configuration applications 122 or the router port configurator 128 may dynamically apply a port configuration policy to the SFP port 116(1) of the network router 112 based at least on a measured data transmission speed of the SFP transceiver 114(1) as the transceiver communicates with the SFP transceiver 114(2) via the fiber optic cable 120. In such a scenario, the SFP transceiver 114(1) may be configured to report its actual measured data transmission speed to the router configuration application 122 at regular time intervals. In some implementations, the measured data transmission speed of the SFP transceiver 114(1) is then passed by the router configuration application 122 to the router port configurator 128 via SNMP trap messages or other control plane messages. Accordingly, the router configuration application 122 or the router port configurator 128 may use the measured data transmission speed from the SFP transceiver 114(1), instead of the maximum data transmission speed, along with other device features and router parameters to identify a suitable port configuration policy for the SFP port 116(1).

In various embodiments, the router configuration application 122 of the network router 112 may provide a user configuration menu that enables an administrator to manually input port configuration policies for the ports of the network router 112. The user configuration menu may be accessible to the administrator following the submission of authentication credentials (e.g., a username, a password, etc.) to the router configuration application 122. Following the input of a port configuration policy for a port (e.g., SFP port 116(1)), the router configuration application 122 may apply the policy to the corresponding port. The application of the manually inputted port configuration policy to an SFP port may cause router configuration application 122 to override any existing SFP port configuration policy applied to the SFP port. Such an override may be in place until the router configuration application 122 is notified that a new SFP transceiver is inserted in the SFP port. Likewise, the router port configurator 128 of the wireless carrier network 102 may also provide a similar user configuration menu that enables an administrator to manually input port configuration policies for the ports of the network routers. The application of the manually inputted port configuration policy to a port may cause the router port configurator 128 to direct the router configuration application 122 of the network router 112 to override any existing SFP port configuration policy for the SFP port until the router configuration application 122 detects that a new SFP transceiver is inserted in the SFP port.

While the dynamic implementation of port configuration policies for an SFP port of a network router is discussed in FIG. 1 in the context of a wireless carrier network 102, it will be appreciated that the techniques are applicable to network routers in any type of network. Thus, the embodiments described in the context of FIG. 1 are illustrative rather than limiting. In some embodiments, a port configuration policy may be a QoS policy for an SFP port that reconfigures the SFP port to meet one or more QoS guarantees for data transferred through the SFP port. The application of the port configuration policy may configure the port to queue incoming data traffic from a higher speed network interface in a router buffer allocated to the port, and then serialize out the data traffic from the router buffer at a data transmission speed that is equal to or less than the speed of a lower speed network interface to prevent data packet drop or data packet retransmission. The QoS policy may also include port configuration settings, such as a buffer size setting, priority traffic settings, best effort settings, a bottom queue settings, etc. for data traffic of various data traffic types. Furthermore, the router configuration application 122 and the router port configurator 128 may be configured to dynamically implement port configuration policies to the ports (both SFP ports and non-SFP ports) for other purposes. For example, such purposes may include network route dampening, network architecture reconfiguration of a network that includes the network router, and/or so forth.

Example Network Router Components

Figure 2:
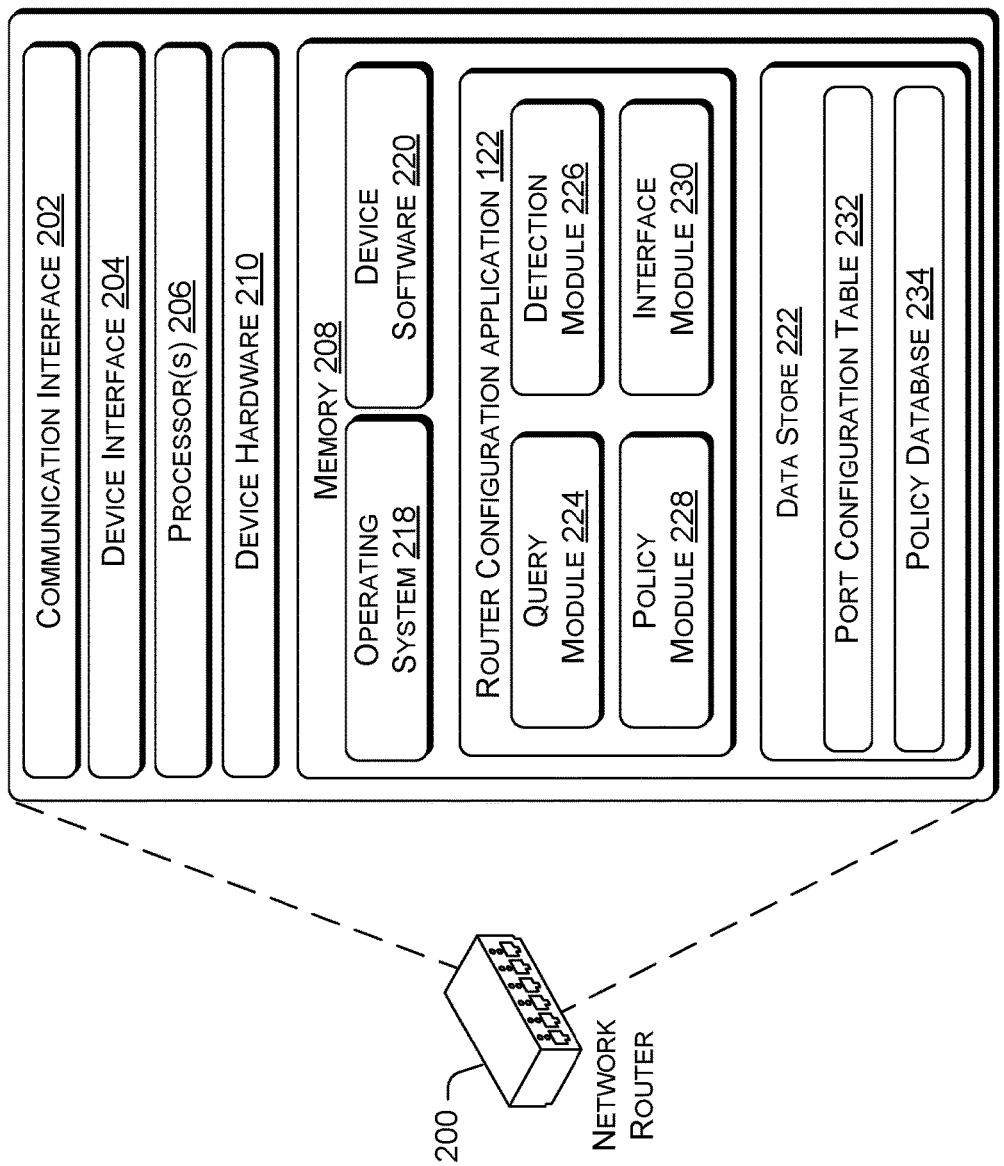
FIG. 2 is a block diagram showing various components of a network router that dynamically implements a port configuration policy for a port of the network router to support a data transmission speed of the port.

FIG. 2 is a block diagram showing various components of a network router that dynamically implements a port configuration policy for a port of the network router to support a data transmission speed of the port. The network router 200 may represent any network router that is active on a network. The network router 200 may be equipped with a communication interface 202, a device interface 204, one or more processors 206, memory 208, and other device hardware 210.

The communication interface 202 may include wireless and wired communication components that enable the network router 200 to send and receive data. In various embodiments, the wireless communication components may include a transceiver. The wired communication components may include an Ethernet interface, a USB interface, or other I/O interfaces. In some instances, the wired communication components may enable the network router 200 to connect to a network cell and the core network.

The device interface 204 may enable a user to provide inputs and receive outputs from the network router 200. The device interface 204 may include a data output device (e.g., visual display, audio speakers, tone generators, indicators lights, etc.). Each of the processors 206 may be a single-core processor, a multi-core processor, a complex instruction set computing (CISC) processor, or another type of processor. The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 210 may include other hardware that are typically located in a network router. For example, the device hardware 210 may include a power source, signal converters, antennas, hardware decoders and encoders, digital signal processors (DSPs), graphic processors, modem, and/or the like that enable the network router 200 to execute applications and provide telecommunication and data communication functions.

The memory 208 may store an operating system 218, device software 220, and the router configuration application 122. The memory 208 may further provide a data store 222. The operating system 218 may include components that enable the network router 200 to receive and transmit data via various interfaces (e.g., user controls, communication interface 202, and/or memory input/output devices). The operating system 218 may also process data using the one or more processors 206 to generate outputs based on inputs that are received via the device interface 204. For example, the operating system 218 may provide an execution environment for the execution of the device software 220. The operating system 218 may include a presentation component that presents the output (e.g., display the data on an electronic display, store the data in memory, transmit the data to another electronic device, etc.). Additionally, the operating system 218 may include other components that perform various other functions generally associated with an operating system.

The device software 220 may include software components that enable the network router 200 to perform data traffic routing functions, as well as other functions that are typically associated with a router. For example, the device software 220 may include logics and functions that enable the network router 200 to detect and use SFP transceivers that are plugged into the SFP ports of the network router 200. The device software 220 may further include a queue scheduling function that configures various queues (e.g., a high priority queue, a best effort queue, a bottom queue, etc.) to queue incoming and outgoing data traffic of various types for routing between various source and recipient devices. The queue scheduling function may further allocate and configure queues for different ports of the network router 200. Accordingly, the queue scheduling function may implement the configuration settings in a port configuration policy to manage queues.

The router configuration application 122 may include a query module 224, a detection module 226, a policy module 228, and an interface module 230. Each module may include routines, program instructions, objects, and/or data structures that perform particular tasks or implement particular abstract data types. The query module 224 may obtain information on one or more device features from an SFP transceiver after being notified by the device software 220 that the SFP transceiver is plugged into an SFP port. In some instances, the query module 224 may obtain the information from the SFP transceiver by sending a query command to the SFP transceiver for the transceiver to return the information. In other instances, the query module 224 may obtain the information by waiting for the SFP transceiver to transmit the information when the SFP transceiver is configured to transmit the information to the network router 200 at predetermined time intervals. The query module 224 may store such information along with a port identifier of the associated port in a port configuration table 232 that is located in the data store 222. In some embodiments, the query module 224 may receive measured data transmission speeds from an SFP transceiver. Accordingly, the one or more device features that are provided by the query module 224 for the SFP transceiver may include the measured data transmission speed rather than the maximum data transmission speed.

The detection module 226 may detect whether an SFP port hosting an SFP transceiver is active. For example, the detection module 226 may determine that an SFP port is active when the port configuration table 232 indicates that the port is designated as an active port ready for use. In another example, the detection module 226 may determine that an SFP port is active when an SFP transceiver plugged into the port has signaled that it is ready to send and receive data after completing a handshake procedure with another SFP transceiver. In another example, the detection module 226 may determine that an SFP port is active when the SFP port is actively transmitting or receiving data packets via an installed SFP transceiver.

The policy module 228 may apply a port configuration policy to an SFP port that is determined to be active based on the one or more device features of the corresponding SFP transceiver plugged into the SFP port. In various embodiments, a policy database 234 of the network router 200 may store multiple port configuration policies for different combinations of device features. Each of the port configuration policies may include metadata that correlates the policy to one or more corresponding device features. The metadata may further identify each port configuration policy by a policy identifier. In some instances, the metadata may be stored in a reference table for the multiple configuration policies. Accordingly, the policy module 228 may use the metadata to identify a particular port configuration policy that correlates to the SFP transceiver plugged into the SFP port and apply the particular port configuration policy to the SFP port. However, if the policy module 228 is unable to identify a corresponding port configuration policy for the SFP port, a default port configuration policy may be applied by the policy module 228 to the SFP port.

The policy database 234 may further store the policy identifier of each policy that is applied to each SFP port in a reference table. Accordingly, when the detection module 226 indicates that an SFP transceiver is plugged into an SFP port, the policy module 228 may identify the corresponding port configuration policy based on information provided by the query module 224. The policy identifier of the identified policy is then compared to the information in the reference table to determine if a matching policy identifier for the SFP port exists in the reference table. If a match exists, the policy module 228 may determine that the correct port configuration policy is already applied. Otherwise, the policy module 228 will apply the identified port configuration policy to the SFP port.

In some embodiments, the policy module 228 may provide a user configuration menu that enables an administrator to manually input port configuration policies for the ports of the network router 112. Following the input of a port configuration policy for an SFP port, the policy module 228 may apply the policy to the SFP port. The application of the manually inputted port configuration policy may override any existing SFP port configuration policy applied to the SFP port with the manually inputted policy. Such an override may be in place until a notification that a new SFP transceiver is inserted in the SFP port is received by the policy module 228 from the device software 220.

The interface module 230 may send and receive communications to the router port configurator 128, such that the router port configurator 128 may dynamically apply port configuration policies to the ports of the network router 200. The communications to the router port configurator 128 may include change notifications, information on one or more features of an SFP transceiver that is plugged into an SFP port, and SFP port information. The communications from the router port configurator 128 may include a policy identifiers of port configuration policies to be applied or copies of the port configuration policies to be applied.

Example Router Port Configurator

Figure 3:
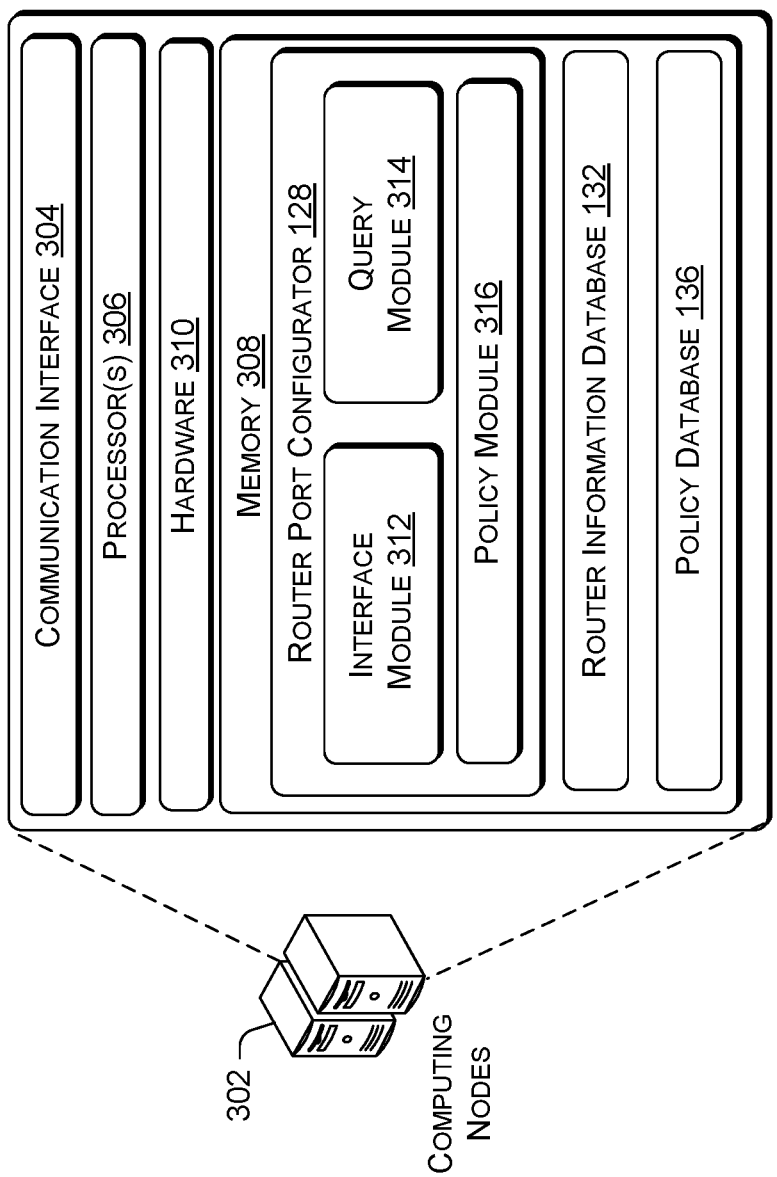
FIG. 3 is a block diagram showing various components of a router port configurator of a wireless carrier network that dynamically implements a port configuration policy for a port of the network router to support a data transmission speed of the port.

FIG. 3 is a block diagram showing various components of a router port configurator of a wireless carrier network that dynamically implements a port configuration policy for a port of the network router to support a data transmission speed of the port. The router port configurator 128 may be implemented by computing nodes 302. The computing nodes or components thereof may include servers, virtual computing devices in the form of virtual machines, or software containers that are hosted in a computing cloud with hardware at different geographical locations. The computing nodes 302 may include a communication interface 304, one or more processors 306, and memory 308. The communication interface 304 may include wireless and/or wired communication components that enable the one or more computing nodes 302 to transmit data to and receive data from other networked devices. The computing nodes 302 may be accessed via hardware 310. The hardware 310 may include additional user interface, data communication, or data storage hardware. For example, the user interface may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The router port configurator 128 may be stored in the memory 308 and executed by the one or more processors 306. The router port configurator 128 may include an interface module 312, a query module 314, and a policy module 316. The modules may include routines, program instructions, objects, and/or data structures that perform particular tasks or implement particular abstract data types. The interface module 312 may send and receive communications to router configuration applications of network routers, such as the router configuration application 122. The communications from a router configuration application may include change notifications, information on one or more features of an SFP transceiver that is plugged into an SFP port, and SFP port information. The communications to a router configuration application may include queries for device feature information, policy identifiers of port configuration policies to be applied, or copies of the port configuration policies to be applied.

The query module 314 may receive information on one or more device features of an SFP transceiver that is plugged into a corresponding SFP port. In some instances, the query module 314 may send a device information query to a router configuration application on a network router to obtain the information on the one or more device features of the SFP transceiver. In other instances, the query module 314 may authenticate to the router configuration application via one or more login credentials, and then trigger the router configuration application to obtain the information from the SFP transceiver 114 and transmit the information to the query module 314.

The policy module 316 may apply a port configuration policy to an SFP port based on the one or more device features of the corresponding SFP transceiver plugged into the SFP port of a network router. In various embodiments, the policy module 316 may access one or more router parameters of the network router from the router information database 132. For example, the policy module 316 may use the router identifier from the port change notification 130 to identify the one or more router parameters of the network router from the router information database 132. The router information database 132 and the policy database 136 are then used by the policy module 316 to determine whether a port configuration policy that corresponds to the one or more device features of the SFP transceiver and the router parameters of the network router is currently applied to the SFP port. The policy database 136 may store multiple port configuration policies for different combinations of device features and router parameters. Each of the port configuration policies may include metadata that correlates the policy to one or more corresponding device features and one or more corresponding router parameters. The metadata may further identify each port configuration policy by a policy identifier. In some instances, the metadata may be stored in a reference table for the multiple configuration policies.

Accordingly, the policy module 316 may first identify a port configuration policy in the policy database 136 that matches the one or more device features of the SFP transceiver and the one or more of the network router. Subsequently, the policy module 316 may use the router information database 132 to determine whether the port configuration policy is already applied to the corresponding SFP port. For example, the policy module 316 may query the router information database 132 for a policy identifier of a port configuration policy currently applied to the SFP port. If such a current policy identifier exists, the policy module 316 may compare a policy identifier of the identified port configuration policy to a policy identifier of the current port configuration policy to determine whether the identifiers match. A match of the policy identifiers means that the correct port configuration policy is already applied. However, if no current policy identifier exists or if the current policy identifier is not a match, the policy module 316 may use the interface module 312 to direct the router configuration application of network router to apply the identified port configuration policy to the SFP port.

In some embodiments, the policy module 316 may provide a user configuration menu that enables an administrator to manually input port configuration policies for the ports of a network router. Following the input of a port configuration policy for an SFP port, the policy module 316 may use the interface module 312 to direct the router configuration application of the network router to apply the policy to the SFP port. The application of the manually inputted port configuration policy may override any existing SFP port configuration policy applied to the SFP port with the manually inputted policy. Such an override may be in place until a notification that a new SFP transceiver is inserted in the SFP port is received by the policy module 316.

Example Processes

Figure 4:
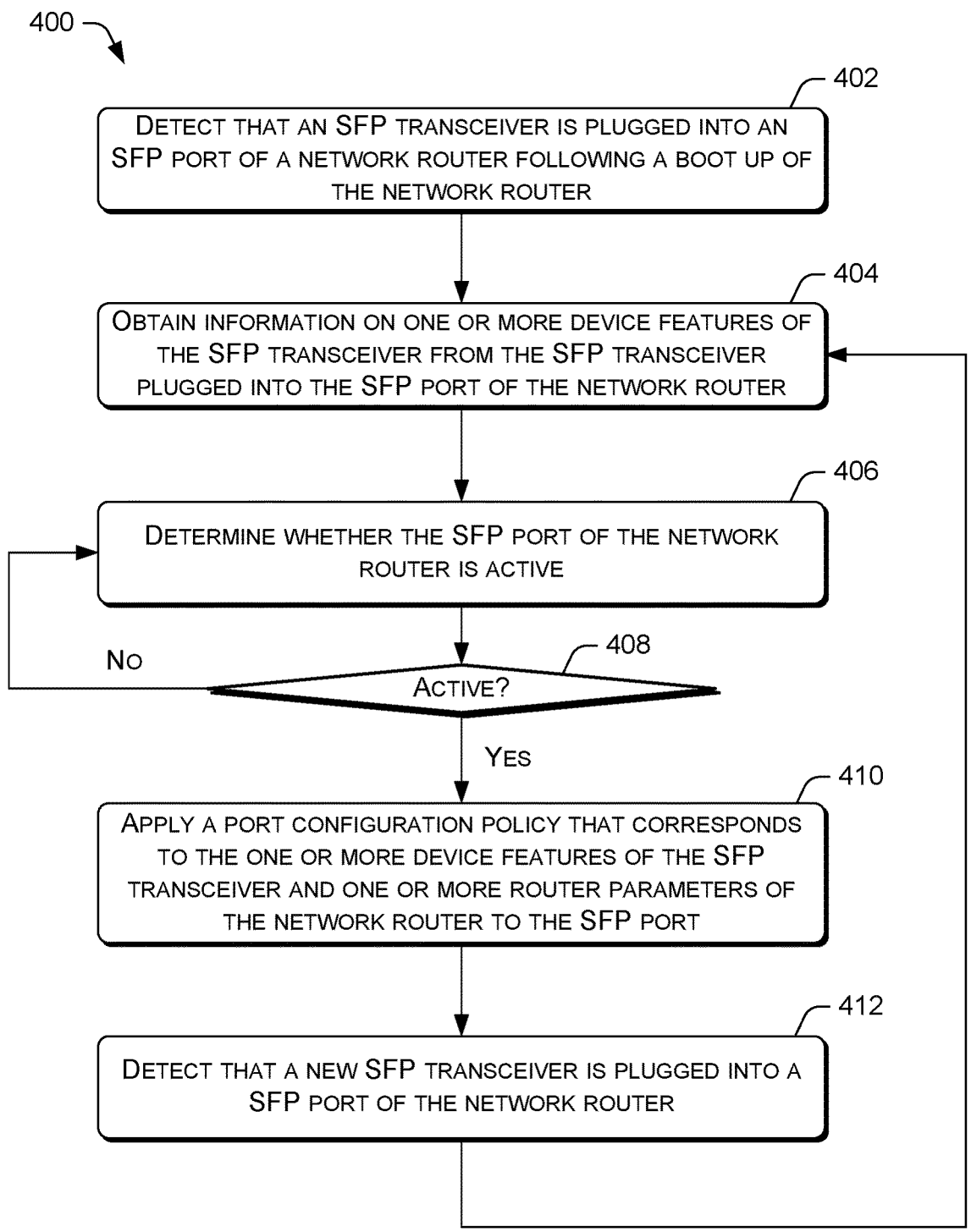
FIG. 4 is a flow diagram of an example process for a network router to dynamically implement a port configuration policy for a port of the network router in response to an installation of a small form-factor pluggable (SFP) transceiver in the port.
Figure 5:
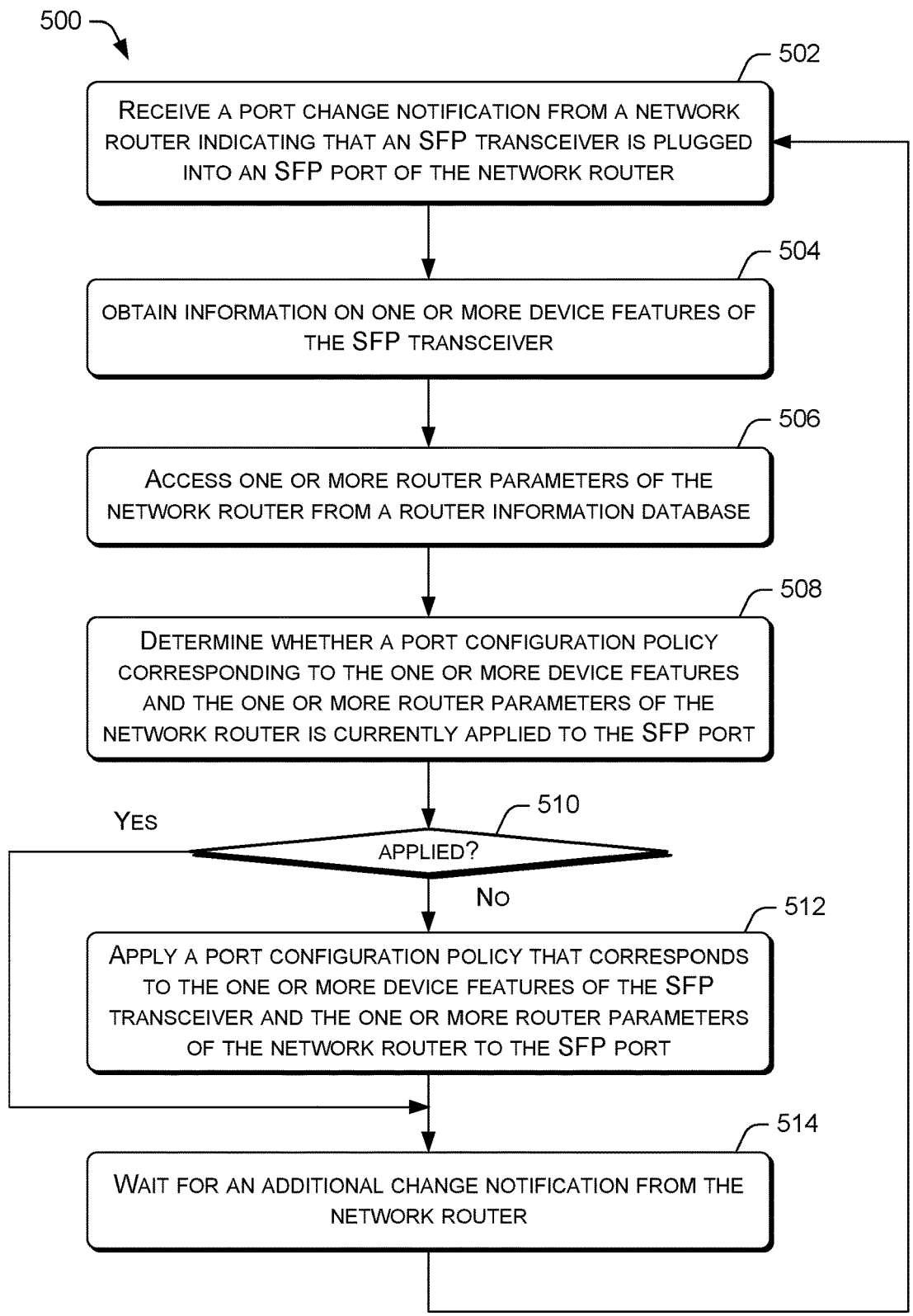
FIG. 5 is a flow diagram of an example process for a router port configurator of a network to dynamically implement a port configuration policy for a port of a network router in response to a notification from the network router.
Figure 6:
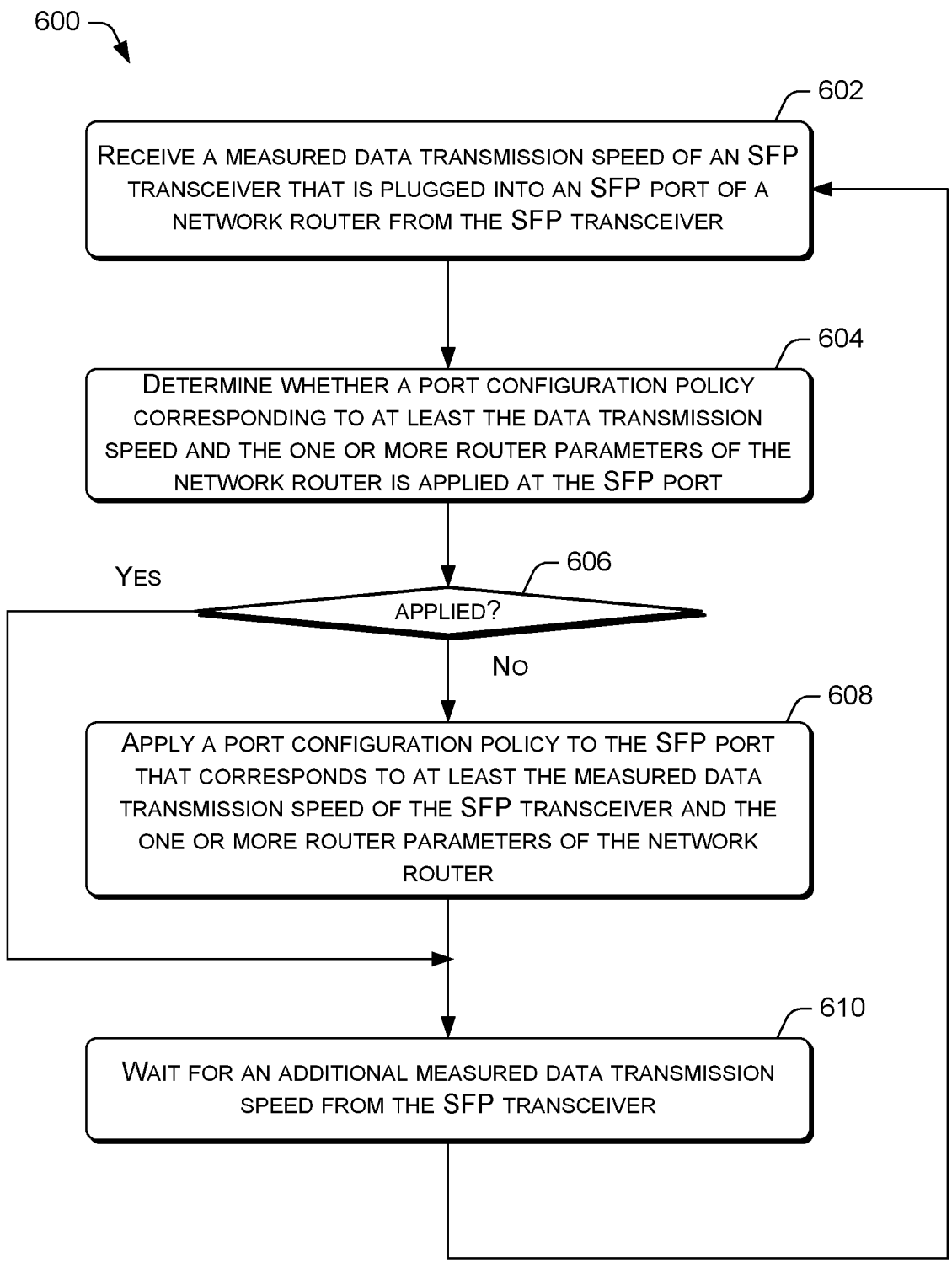
FIG. 6 is a flow diagram of an example process for dynamically implementing a port configuration policy for a port of the network router in response to a measured data transmission speed of an SFP transceiver installed in the port of the network router.

FIGS. 4-6 present illustrative processes 400-600 for dynamically implementing a port configuration policy for a port of a network router. Each of the processes 400-600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the network architecture 100 of FIG. 1.

FIG. 4 is a flow diagram of an example process 400 for a network router to dynamically implement a port configuration policy for a port of the network router in response to an installation of a small form-factor pluggable (SFP) transceiver in the port. At block 402, the router configuration application of a network router, such as the router configuration application 122, may detect that an SFP transceiver is plugged into an SFP port of network router following bootup of the network router. During the bootup of the network router, the router configuration application may read a router configuration file for the network router that contains various router settings. For example, the router settings may include a feature setting regarding whether an automatic implementation of port configuration policies is active or non-active. Accordingly, in some embodiments, the remaining blocks of the process 400 may be implemented when the automatic implementation is active.

At block 404, the router configuration application may obtain information on one or more device features of the SFP transceiver from the SFP transceiver that is plugged into the SFP port of the network router. In some instances, the router configuration application may send a query command to the SFP transceiver for the transceiver to return the information. In other instances, the router configuration application may obtain the information by waiting for the SFP transceiver to transmit the information.

At block 406, the router configuration application may determine whether the SFP port of the network router is active. For example, the router configuration application may determine that the SFP port is active when the SFP port is actively transmitting or receiving data packets via an installed SFP transceiver. At decision block 408, if the SFP port is determined to be active ("yes" at decision block 408), the process 400 may proceed to block 410. At block 410, the router configuration application may apply a port configuration policy that corresponds to one or more device features of the SFP transceiver and one or more router parameters of the network router to the SFP port. The information on the one or more device features may include a transceiver manufacturer identifier, a transceiver model identifier, a transceiver chipset identifier, the device identifier of the transceiver, a maximum data transmission speed supported by the transceiver, transmission modes supported by the transceiver, and/or so forth. The one or more router parameters of a network router may include a router manufacturer identifier, a router model identifier, an identifier of the router (e.g., an electronic serial number), a router chipset identifier, a router hardware version identifier, a router software version identifier, and/or so forth.

At block 412, the router configuration application may detect that a new SFP transceiver is plugged into the SFP port of the network router. In various embodiments, the new SFP transceiver may be detected when the new SFP transceiver completes a device activation procedure and sends a device identifier to the network router. Accordingly, the process 400 may loop back to block 404. Returning to decision block 408, if the SFP port is determined to be not active ("no" at decision block 408), the process 400 may loop back to block 406. In various embodiments, any port configuration policy that is dynamically applied by the router configuration application to the SFP port may be overridden by a manually inputted port configuration policy until a new SFP transceiver is inserted at the SFP port.

FIG. 5 is a flow diagram of an example process 500 for a router port configurator of a network to dynamically implement a port configuration policy for a port of a network router in response to a notification from the network router. At block 502, the router port configurator, such as the router port configurator 128, may receive a port change notification from a network router indicating that an SFP transceiver is plugged into an SFP port of the network router on a network. For example, the port change notification 130 may be an SNMP trap message or some other control plane message that is sent by the router configuration application to the router port configurator. The port change notification may be sent by the network router following detection by the router configuration application 122 that the SFP transceiver is plugged into the SFP port.

At block 504, the router port configurator 128 may obtain information on one or more device features of the SFP transceiver. In some instances, the router port configurator may send a device information query to the network router via a device management communication, such as SNMP communication, and the router configuration application on the network router may obtain the information on the one or more device features from the SFP transceiver and return the information to the router port configurator. In other instances, the router port configurator may authenticate to the router configuration application via one or more login credentials, and then trigger the router configuration application to obtain the information from the SFP transceiver and transmit the information on the one or more device features to the router port configurator.

At block 506, the router port configurator 128 may access one or more router parameters of the network router from a router information database. The router information database may be an information repository maintained by the network regarding network routers that are active in the network. The router information database may further include information on the port configuration policies that are applied to the various ports of the network routers.

At block 508, the router port configurator 128 may determine whether a port configuration policy corresponding to the one or more device features and the one or more router parameters of the network router is currently applied to the SFP port. For example, a data entry in the router information database for a port configuration policy that is applied to a port of a network router may identify one or more device features of an SFP transceiver and one or more router parameters of a router that corresponds to the port configuration policy. At decision block 510, if such a port configuration policy is not applied to the SFP port ("no" at decision block 510), the process 500 may proceed to block 512. At block 512, the router port configurator 128 may apply a port configuration policy that corresponds to the one or more device features of the SFP transceiver and the one or more router parameters of the network router to the SFP port. For example, the router port configurator may send a policy identifier of the port configuration policy to the router configuration application, so that the router configuration application may retrieve a policy from an onboard policy database and apply the policy to the SFP port. Alternatively, the router port configurator may send a port configuration policy that is stored in a policy database of the network to the network router for application by the router configuration application to the SFP port.

At block 514, the router port configurator 128 may wait for an additional change notification from the network router. Returning to decision block 510, if the router port configurator 128 determines that a port configuration policy corresponding to the one or more device features and the one or more router parameters of the network router is currently applied to the SFP port, the process 500 may proceed directly to block 514. In various embodiments, any port configuration policy that is dynamically applied by the router port configurator to the SFP port may be overridden by a manually inputted port configuration policy until a new SFP transceiver is inserted at the SFP port.

FIG. 6 is a flow diagram of an example process 600 for dynamically implementing a port configuration policy for a port of the network router in response to a measured data transmission speed of an SFP transceiver installed in the port of the network router. At block 602, an application may receive a measured data transmission speed of an SFP transceiver that is plugged into an SFP port of a network router from the SFP transceiver. In various embodiments, the application may be a router configuration application that resides on a network router or a router port configurator that resides on a core network. At block 604, the application may determine whether a port configuration policy corresponding to at least the transmission speed and the one or more router parameters of the network router is applied at the SFP port. In instances in which the application is the router configuration application, the router configuration application may first identify a policy identifier of a port configuration policy in the policy database 136 that matches at least the data transmission speed of the SFP transceiver and the one or more router parameters of the network router. The policy identifier is then used by the router configuration application to check against a policy identifier stored in a policy database as belonging to a policy applied to the SFP port to make the determination. In instances in which the application is the router port configurator of a network, the configurator may check information stored in a router information database of the network in a similar manner to make the determination. At decision block 606, if the application determines that such a port configuration policy applied ("yes" at decision block 606), the process 600 may proceed to block 608.

At block 608, the application may apply a port configuration policy to the SFP port that corresponds to at least the measured data transmission speed of the SFP transceiver and the one or more router parameters of the network router. In instances in which the application is the router configuration application, the router configuration application may retrieve the port configuration policy from an onboard policy data store and apply the policy to the SFP port. In instances in which the application is the router port configurator of a network, the configurator may send a policy identifier of the port configuration policy to the router configuration application, so that the router configuration application may retrieve a policy from an onboard policy database and apply the policy to the SFP port. Alternatively, the router port configurator may send a port configuration policy to the network router for application by the router configuration application to the SFP port. At block 610, the application may wait for an additional measured data transmission speed from the SFP transceiver. Subsequently, the process 600 may loop back to block 602.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A network router, comprising:
one or more processors; and
memory including one or more data queues and a plurality of computer-executable components that are executable by the one or more processors to perform a plurality of actions, the plurality of actions comprising:
detecting that a small form-factor pluggable (SFP) transceiver is plugged into an SFP port of the network router following a bootup of the network router;
obtaining information on one or more device features of the SFP transceiver from the SFP transceiver plugged into the SFP port of the network router; and
applying a port configuration policy that corresponds to the one or more device features of the SFP transceiver and one or more router parameters of the network router to the SFP port of the network router, wherein the port configuration policy is a quality of service (QoS) policy that reconfigures the SFP port to meet one or more QoS guarantees for data transferred through the SFP port.

2. The network router of claim 1, wherein the one or more device features include a maximum data transmission speed supported by the SFP transceiver or a measured data transmission speed of the SFP transceiver.

3. The network router of claim 2, wherein the one or more device features further include at least one of a transceiver manufacturer identifier, a transceiver model identifier, a transceiver chipset identifier, or a device identifier of the transceiver.

4. The network router of claim 1, wherein the one or more router parameters include at least one of a router manufacturer identifier, a router model identifier, a device identifier of the network router, a router chipset identifier, a router hardware version identifier, or a router software version identifier.

5. The network router of claim 1, wherein the actions further comprises reading one or more router settings in a router configuration file in the memory of the network router following the bootup of the network router, and wherein the obtaining information on the one or more device features include obtaining the information in response to the one or more router settings indicates that automatic implementation of port configuration policies is active for the network router.

6. The network router of claim 1, wherein the applying includes applying the port configuration policy to the SFP port in response to a determination that the SFP port is active.

7. The network router of claim 6, wherein the SFP port is determined to be active when data stored in the memory of the network router indicates that the SFP port is designated as an active port ready for use, when the SFP transceiver plugged into the SFP port has signaled that the SFP transceiver is ready to send and receive data after completing a handshake procedure with an additional SFP transceiver, or when the SFP port is actively transmitting or receiving data packets via the SFP transceiver.

8. The network router of claim 1, wherein the actions further comprise:
receiving a manually inputted port configuration policy via a user configuration menu of the network router; and
applying the manually inputted port configuration policy to the SFP port to override the port configuration policy.

9. The network router of claim 1, wherein the QoS policy configures the SFP port to queue incoming data traffic from an upstream higher speed network interface in a router buffer allocated to the SFP port, and then serialize out the incoming data traffic from the router buffer at a data transmission speed that is equal to or less than a speed of a downstream lower speed network interface to prevent data packet drop or data packet retransmission.

10. The network router of claim 9, wherein the QoS policy further includes a buffer size setting, a priority traffic setting, a best effort setting, a bottom queue setting for at least one data traffic type.

11. The network router of claim 1, wherein the actions further include:
detecting that a new SFP transceiver is plugged into an SFP port of the network router;
obtaining information on one or more additional device features of the new SFP transceiver from the new SFP transceiver plugged into the SFP port of the network router; and
applying an additional port configuration policy that corresponds to the one or more additional device features of the SFP transceiver and one or more router parameters of the network router to the SFP port of the network router.

12. The network router of claim 1, wherein the actions further include applying an additional port configuration policy to the SFP port to provide one or more of network route dampening or network reconfiguration of a network that includes the network router.

13. One or more non-transitory computer-readable media storing computer-executable instructions that upon execution cause one or more processors to perform acts comprising:
receiving a port change notification from a network router of a network indicating that a small form-factor pluggable (SFP) transceiver is plugged into an SFP port of the network router;
obtaining information on one or more device features of the SFP transceiver from the network router;
accessing one or more router parameters of the network router from a router information database of the network; and
applying a port configuration policy that corresponds to the one or more device features of the SFP transceiver and one or more router parameters of the network router to the SFP port,
wherein the port configuration policy is a quality of service (QoS) policy that reconfigures the SFP port to meet one or more QoS guarantees for data transferred through the SFP port.

14. The one or more non-transitory computer-readable media of claim 13, wherein the receiving a port change notification includes receiving a simple network management protocol (SNMP) trap message that includes the port change notification.

15. The one or more non-transitory computer-readable media of claim 13, wherein the applying includes sending a policy identifier of the port configuration policy to the network router to direct the network router to retrieve port configuration policy from an onboard policy database and applying the port configuration policy to the SFP port, or sending the port configuration policy that is stored in a policy database of the network to the network router for application to the SFP port.

16. The one or more non-transitory computer-readable media of claim 13, wherein the one or more device features include a maximum data transmission speed supported by the SFP transceiver or a measured data transmission speed of the SFP transceiver.

17. The one or more non-transitory computer-readable media of claim 13, wherein the one or more router parameters include at least one of a router manufacturer identifier, a router model identifier, a device identifier of the network router, a router chipset identifier, a router hardware version identifier, or a router software version identifier.

18. The one or more non-transitory computer-readable media of claim 13, wherein the acts further comprise:
receiving a manually inputted port configuration policy via a user configuration menu; and
applying the manually inputted port configuration policy to the SFP port to override the port configuration policy.

19. A computer-implemented method, comprising:
detecting, at a network router, that a small form-factor pluggable (SFP) transceiver is plugged into an SFP port of the network router following a bootup of the network router;
obtaining, at the network router, information on one or more device features of the SFP transceiver from the SFP transceiver plugged into the SFP port of the network router; and
applying, at the network router, a port configuration policy that corresponds to the one or more device features of the SFP transceiver and one or more router parameters of the network router to the SFP port of the network router,
wherein the port configuration policy is a quality of service (QoS) policy that reconfigures the SFP port to meet one or more QoS guarantees for data transferred through the SFP port.

20. The computer-implemented method of claim 19, wherein the QoS policy configures the SFP port to queue incoming data traffic from an upstream higher speed network interface in a router buffer allocated to the SFP port, and then serialize out the incoming data traffic from the router buffer at a data transmission speed that is equal to or less than a speed of a downstream lower speed network interface to prevent data packet drop or data packet retransmission.

* * * * *